United States Patent
Isaji et al.

(10) Patent No.: US 8,150,591 B2
(45) Date of Patent: *Apr. 3, 2012

(54) VEHICLE TRAVEL SPEED CONTROL METHOD

(75) Inventors: Kazuyoshi Isaji, Kariya (JP); Naohiko Tsuru, Handa (JP)

(73) Assignee: Denso Corporation, Kariya (JP)

( * ) Notice: Subject to any disclaimer, the term of this patent is extended or adjusted under 35 U.S.C. 154(b) by 420 days.

This patent is subject to a terminal disclaimer.

(21) Appl. No.: 12/456,864

(22) Filed: Jun. 24, 2009

(65) Prior Publication Data

US 2010/0023232 A1    Jan. 28, 2010

(30) Foreign Application Priority Data

Jul. 28, 2008    (JP) .................................. 2008-194002

(51) Int. Cl.
*G06F 19/00* (2011.01)
(52) U.S. Cl. ................ 701/70; 701/36; 701/93; 701/96; 701/301; 340/425.5; 340/903
(58) Field of Classification Search .................... 701/70, 701/72, 36, 93, 96, 301; 340/425.5, 903; 342/70

See application file for complete search history.

(56) References Cited

U.S. PATENT DOCUMENTS

| | | | |
|---|---|---|---|
| 5,661,650 A | 8/1997 | Sekine et al. | |
| 5,928,299 A | 7/1999 | Sekine et al. | |
| 7,395,144 B2 | 7/2008 | Isaji et al. | |
| 7,925,413 B2 * | 4/2011 | Isaji et al. | 701/93 |
| 2007/0106445 A1 | 5/2007 | Suzuki et al. | |
| 2008/0059037 A1 | 3/2008 | Isaji et al. | |

FOREIGN PATENT DOCUMENTS

| | | |
|---|---|---|
| JP | 51-115934 | 5/1993 |
| JP | 2007-127101 | 5/2007 |
| JP | 2008-12975 | 1/2008 |
| JP | 2008-062672 | 3/2008 |
| JP | 2008-074378 | 4/2008 |
| JP | 2008-077412 | 4/2008 |
| JP | 2008-280016 | 11/2008 |

OTHER PUBLICATIONS

Office Action dated Jun. 1, 2010 in Japanese Application No. 2005-157203 with English translation thereof.
Office action dated Jun. 8, 2010 in corresponding Japanese Application No. 2008-194002.

* cited by examiner

*Primary Examiner* — Gertrude Arthur Jeanglaude
(74) *Attorney, Agent, or Firm* — Harness, Dickey & Pierce, PLC

(57) ABSTRACT

A vehicle speed control method calculates a present value KdB_c(a)_p of a corrected evaluation index of approach/separation condition by the following equation, and starts deceleration control when the determined present value KdB_c(a)_p exceeds a threshold value determined by a braking determining equation. In the deceleration control, a corrected target relative speed is determined based on an evaluation index KdB:

$$\mathrm{KdB\_c}(a) = 10 \times \log_{10}\left(\left|-2 \times \frac{VrGy - a \times VrGy\_offset}{Ds^3} \times \frac{1}{5 \times 10^{-8}}\right|\right)$$

wherein VrGy_offset, VrGy, a, Ds indicate a curve-time target speed, a difference between the curve-time target speed and a speed of a subject vehicle, a constant and a curve entrance arrival distance, respectively.

2 Claims, 3 Drawing Sheets

VEHICLE TRAVEL SPEED CONTROL METHOD

CROSS REFERENCE TO RELATED APPLICATION

This application is based on and incorporates herein by reference Japanese Patent Application No. 2008-194002 filed on Jul. 28, 2008.

FIELD OF THE INVENTION

The present invention relates to a vehicle travel speed control method, which performs vehicle travel control at the time of entering a curving road.

BACKGROUND OF THE INVENTION

US 2008/0059037 (JP 2008-062672) proposes a vehicle speed control system, which controls vehicle travel speed by using, as a distance condition relative to an object present in a forward direction of a subject vehicle, an evaluation index indicating an approach/separation condition and determined based on a time change rate of a seeming area of a forward object projected on a retina of a driver of the subject vehicle. In this system, a target travel speed $Vs0\_t$ of the subject vehicle for traveling a curving road is set based on a present value $Gy\_p$ of a lateral acceleration G of the subject vehicle when traveling the curving road and a radius of curvature R of the curving road. When a difference between the target speed $Vs0\_t$ and a present travel speed $Vs0$ of the subject vehicle is greater than a predetermined difference, a target acceleration/deceleration speed $dVs0dt$ for accelerating or decelerating the subject vehicle to the target speed $Vs0\_t$ is determined based on the present evaluation index $KdB\_p$ indicating the approach/separation condition of the subject vehicle, a distance D between the subject vehicle and a fixture attached to the road in the forward direction of the subject vehicle, the present speed $Vs0$ of the subject vehicle and the target speed of the subject vehicle $Vs0\_t$. Thus, the acceleration and deceleration of the subject vehicle is automatically controlled to the target acceleration/deceleration speed $dVs0dt$.

According to the above-proposed system, the radius of curvature R is determined as a value greater at a position before an entrance of the curving road as the distance D between the subject vehicle and the fixture of the road increases than at a position of the entrance of the curving road. As a result, the target speed $Vs0\_t$ for traveling the curving road ahead the subject vehicle is determined to be a greater value. The radius of curvature R at the curving road is calculated to be less at the entrance position of the curving road. As a result, the target speed $Vs0\_t$ for traveling the curving road ahead the subject vehicle is determined to be less.

For this reason, the difference in the speed between the actual speed $Vs0$ and the target speed $Vs0\_t$ of the subject vehicle is not reduced sufficiently. It is thus not possible to perform the speed control, which matches actual sense of a driver of the subject vehicle entering the curving road.

SUMMARY OF THE INVENTION

It is therefore an object of the present invention to provide a vehicle speed control method, which performs vehicle speed control matching actual sense of a driver of a subject vehicle entering a curving road.

According to the present invention, a vehicle speed control method determines an actual speed of a subject vehicle; determines a radius of curvature of a curving road existing ahead the subject vehicle; determines a curve entrance arrival distance indicating a distance, which the subject vehicle travels from a present position to an entrance of the curving road; determines a target lateral acceleration, which the subject vehicle receives in traveling the curving road; determines a curve-time target speed, to which the subject vehicle is controlled in traveling the curving road, based on the radius of curvature of the curving road and the target lateral acceleration; determines a speed difference between the curve-time target speed and the actual speed; determines a corrected evaluation index, as an index indicating an approach/separation condition of the subject vehicle relative to the entrance of the curving road in correspondence to the curve-time target speed, based on a rate of time change of a seeming area of a forward object projected on a retina of a driver, the corrected evaluation index increasing as the speed difference increases and increasing at a greater rate as the curve entrance arrival distance decreases with respect to a same speed difference; checks whether the corrected evaluation index exceeds a threshold value determined by an evaluation index threshold determining equation; determines a corrected target relative speed based on a corrected target relative speed determining equation and the curve-entrance arrival distance, when the corrected evaluation index is determined to exceed the threshold value; determines a target deceleration of the subject vehicle based on the corrected target relative speed and the actual speed of the subject vehicle; and controls the subject vehicle to attain the target deceleration.

The corrected relative speed determining equation is pre-stored in a memory to correct a target relative speed determining equation to the corrected target relative speed determining equation by using the curve-time-target speed as an offset speed so that the target relative speed at the entrance of the curving road becomes the curve-time target speed. The target relative speed determining equation is determined based on an evaluation index relational equation and a tangential line equation thereby to determine the target relative speed based on the curve entrance arrival distance. The evaluation index relational equation defining a relation among the evaluation index indicating the approach/separation condition of the subject vehicle relative to the entrance of the curving road, the curve entrance arrival distance and the relative speed of the subject vehicle to the entrance of the curving road, the evaluation index increasing as the relative speed increases and increasing at a greater rate as the curve entrance arrival distance decreases with respect to a same relative speed of the subject vehicle relative to the entrance of the curving road. The tangential line equation indicates a tangential line represented by the evaluation index relational equation and is determined by differentiating the evaluation index relational equation by the curve entrance arrival distance, and indicates a relation between the evaluation index and the curve entrance arrival distance;

Preferably, the corrected evaluation index is calculated by the following equation (1):

$$KdB\_c(a) = 10 \times \log_{10}\left(\left|-2 \times \frac{VrGy - a \times VrGy\_offset}{Ds^3} \times \frac{1}{5 \times 10^{-8}}\right|\right) \quad (1)$$

wherein $KdB\_c(a)$ is the corrected evaluation index, $VrGy$ is the speed difference, a is a constant, $VrGy\_offset$ is a curve-time target speed, and $Ds$ is the curve entrance arrival distance.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

According to an embodiment of the present invention, a vehicle travel speed control method is applied to a vehicle drive assisting system.

Figure 1:
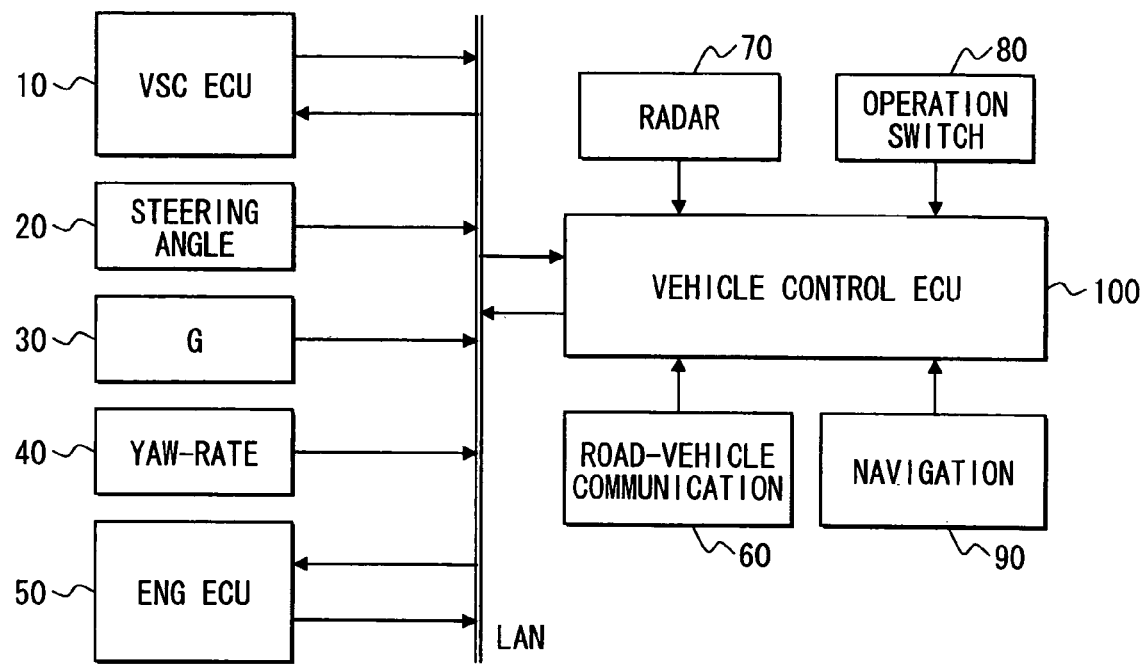
FIG. 1 is a block diagram showing an embodiment of a drive assisting system embodying the present invention.

As shown in FIG. 1, the vehicle drive assisting system for a subject vehicle (not shown) is configured with a vehicle stability control electronic control unit (VSC ECU) 10, a steering angle sensor 20, a G sensor 30, a yaw-rate sensor 40, an engine electronic control unit (ENG ECU) 50, a road-vehicle communications device 60, a radar device 70, operation switches 80, a navigation device 90 and a vehicle control electronic control unit (ECU) 100.

The VSC ECU 10 is configured to control a brake actuator (not shown), which applies braking force to a subject vehicle to decelerate the subject vehicle, and is provided with a function of vehicle stability control, which suppresses skidding of the subject vehicle. The VSC ECU 10 is configured to receive information about a target deceleration from an in-vehicle LAN and control the brake actuator for generating the target deceleration in the subject vehicle. The VSC ECU 10 is configured to transmit information about a travel speed Vs0 and braking force of the subject vehicle to the in-vehicle LAN. The steering angle sensor 20 is configured to detect a steering angle of a steering wheel (not shown) of the subject vehicle and transmit information about the detected steering angle to the in-vehicle LAN.

The G sensor 30 is configured to detect acceleration (longitudinal G) generated in the forward and rearward direction of the subject vehicle and lateral acceleration (lateral G) generated in the left and right direction of the subject vehicle and transmit information about the detected longitudinal G and, the lateral G to the in-vehicle LAN. The yaw-rate sensor 40 is configured to detect an angular velocity (yaw-rate) of the subject vehicle about a vertical axis of the subject vehicle and transmit information about the detected yaw-rate.

The ENG ECU 50 is configured to receive the information about the target acceleration from the in-vehicle LAN and control a throttle actuator (not shown) for generating the target acceleration of the subject vehicle. The road-vehicle communications device 60 is configured to perform road-vehicle communications with road-side communications devices of road-side infrastructure provided along a road. The road-vehicle communications device 60 is configured to receive curve information at a position well before an entrance position of a curving road in a case that a road ahead the subject vehicle is curving. The curve information includes a radius of curvature R, a coefficient of friction μ of road surface, a coordinate (latitude and longitude) of an entrance and an exit, a road width, number of traffic lanes, width of each traffic lane and the like, which are all of the curving road. A dedicated short range communication (DSRC) or the like is used for the road-vehicle communications.

The radar device 70 is configured to transmit, for example, laser light into a predetermined range ahead the subject vehicle and receive reflected light beam for detecting a distance D, a displacement (lateral deviation amount) or the like, which are outputted to the vehicle control ECU 100. The distance D is a distance between the subject vehicle and an outer road boundary of the curving road ahead the subject vehicle or a road fixture provided at or around the road boundary. The outer road boundary means a border, outside which a vehicle cannot travel a traffic lane. The displacement is a deviation between a central axis of the subject vehicle and that of a preceding vehicle in the lateral direction of vehicles.

The operation switches 80 includes a plurality of switches, which is operated by a driver of the subject vehicle. Information about the operation of each switch is outputted to the vehicle control ECU 100. The navigation device 90 is configured with a position detector, road map data storage device, a color display and a control unit, although not shown in the figure. The position detector includes an earth magnetism sensor, a gyroscope, a distance sensor, a receiver for a global positioning system (GPS) and the like. The GPS receiver is for detecting a present position of the subject vehicle based on radio waves from satellites. The road map data storage device is for storing road map data therein. The color display may be an LCD, a CRT or the like.

The road map data includes link data and node data for defining roads on a map by links and nodes. The link data and the node data include a start point coordinate and an end point coordinate, link length, width and the like of each link. The navigation device 90 is configured to specify a coordinate (latitude and longitude) of a present position of the subject vehicle in response, to a command from the vehicle control ECU 100. The navigation device 90 is configured to output the link data and the node data of roads, where the subject vehicle is presently traveling and the curving road existing within a predetermined distance ahead the subject vehicle.

The vehicle control ECU 100 is configured primarily as a microcomputer, which includes a CPU, a ROM, a RAM, an I/O and buses connecting these devices, as known well in the art.

The vehicle control ECU 100 is specifically configured to perform deceleration control automatically by using a corrected target relative speed determining equation stored in a memory (storage device) such as a ROM. This deceleration control is started from a time point, when a present value $KdB\_c(a)\_p$ of a corrected evaluation index evaluation index $KdB\_c(a)$ indicating an approach/separation condition of the subject vehicle exceeds a threshold value $KdB\_c\_t$ of a braking determining equation. Here, the corrected evaluation index $dB\_c(a)$ and the corrected target relative speed determining equation are described in detail.

The corrected evaluation index $KdB\_c(a)$ is an index, which is determined based on a time change rate of a seeming surface of a forward object projected on a retina of a driver of the subject vehicle as disclosed in JP 2008-074378A (U.S. Pat. No. 7,395,144). This evaluation index is determined by using the following mathematical equation (2).

$$\text{KdB\_c}(a) = 10 \times \log_{10}\left(\left|-2 \times \frac{VrGy - a \times VrGy\_offset}{Ds^3} \times \frac{1}{5 \times 10^{-8}}\right|\right) \quad (2)$$

In this equation (2), VrGy is a relative travel speed of the subject vehicle to the preceding vehicle, D is an inter-vehicle distance to the preceding vehicle, Vp is a travel speed of the preceding vehicle and a is a constant. This corrected evaluation index KdB_c(a) is an index indicating the condition of distance of the subject vehicle relative to the preceding vehicle in consideration of the speed of the preceding vehicle. As understood from the equation (2), it increases as the relative speed in approaching the preceding vehicle increases, and a rate of its increase increases at each relative speed as the distance to the preceding vehicle decreases.

In this embodiment, in place of the inter-vehicle distance D to the preceding vehicle, a distance Ds to an entrance of a curving road existing ahead the subject vehicle is used. Further, in place of the speed Vp of the preceding vehicle, a target speed (curve-time target speed) VrGy_offset of the subject vehicle at the time of traveling the curving road is used. In addition, in place of the relative speed VrGy of the subject vehicle to the preceding vehicle, a speed difference VrGy between the curve-time target speed VrGy_offset and the present speed Vs0 is used. That is, according to the embodiment, the corrected distance condition KdB_c(a) is determined by using the following equation (3).

$$\text{KdB\_c}(a) = 10 \times \log_{10}\left(\left|-2 \times \frac{VrGy - a \times VrGy\_offset}{Ds^3} \times \frac{1}{5 \times 10^{-8}}\right|\right) \quad (3)$$

The evaluation index of equation (2) indicates well a time point at which a driver of the subject vehicle starts to decelerate the subject vehicle by automatically bracing under the condition that the preceding vehicle is ahead the subject vehicle. The equation (3) replaces the inter-vehicle distance D, the speed Vp of the preceding vehicle and the relative speed VrGy of the subject vehicle in the equation (2) with the distance Ds to the entrance of the curving road, the curve-time target speed VrGy_offset and the speed difference VrGy, respectively. Therefore, the equation (3) indicates a condition for a driver of the subject vehicle to start to decelerate the subject vehicle so that the speed of the subject vehicle at the entrance of the curving road is controlled to the curve-time target speed VrGy_offset.

The corrected target relative speed determining equation is determined by correcting the following target relative speed determining equation (4).

$$VrGy\_t = -2.5 \times (D - Dc)^3 \times 10^{\left\{-1.303 \times \frac{(D-Dc)}{D_0 - Dc} + \frac{1}{10} \times KdB_0 - 6.697\right\}} \quad (4)$$

This equation (4), the target relative speed determining equation, is derived from the following distance condition evaluation index relational equation (5) and the following tangential line equation (5), which is produced by differentiating the equation (5).

$$|-VrGy\_t| = 2.5 \times (D - Dc)^3 \times 10^{\left(\frac{KdB}{10} - 8\right)} \quad (5)$$

$$KdB\_t = -\frac{13.03}{D_0 - Dc} \times (D - Dc) + KdB_0 + 13.03 \quad (6)$$

Figure 2:
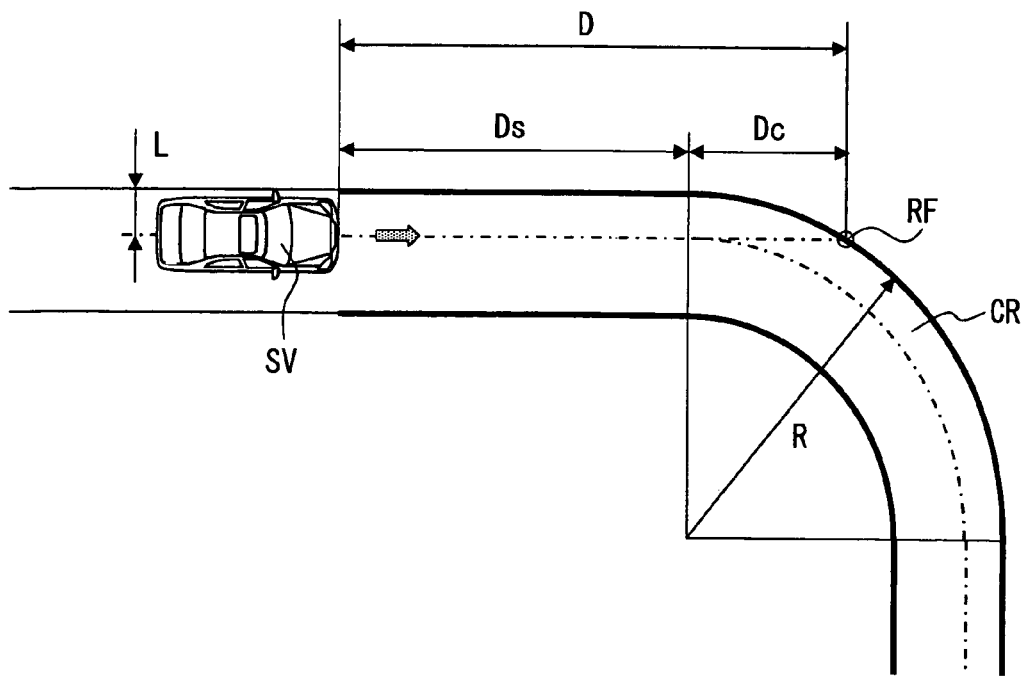
FIG. 2 is a schematic view showing a vehicle entering a curving road.

In the equations (4) to (6), as shown in FIG. 2, D is a distance between a subject vehicle SV and a road boundary of a curving road CR, which is located on a forward extension of the subject vehicle SV, or a road fixture RF provided near the road boundary of the curving road CR. Dc is a distance between an entrance of the curving road CV, that is, an end point of a straight part of a travel road, and the road boundary or the road fixture RF. D0 is D at the time of starting the deceleration control, VrGy_t is a target value of the relative speed of the subject vehicle (target relative speed) relative to the entrance point of the curving road, KdB is an evaluation index indicating an approach/separation condition, KdB 0 is an initial value of KdB at the time of starting the deceleration control, and the KdB_t is a target value of the target approach/separation condition evaluation index KdB.

The equation (5) defines a relation among the evaluation index KdB indicating the condition of approaching and separating of the subject vehicle to and from the entrance of the curving road existing ahead the subject vehicle, a distance (D−Dc) from the subject vehicle to the entrance of the curving road, and the target relative speed (target value of the relative speed of the subject vehicle relative to the entrance point of the curving road) VrGy_t. The evaluation index KdB increases as the target relative speed VrGy_t increases. For the same target relative speed VrGy_t, the rate of increase of the approach/separation condition evaluation index KdB increases as the distance to the entrance of the curving road (D−Dc) decreases, that is, as the subject vehicle approaches the entrance of the curving road. The equation (4) for determining the target relative speed is derived by substituting KdB in the equation (5) with KdB_t of the equation (6) and rearranging.

The corrected target relative speed determining equation is derived by offsetting the target relative speed at the distance D=Dc in the negative direction by an amount of the curve-time target speed VrGy_offset relative to the equation (4), and by causing the target relative speed to change for an interval from D=D0 to D=Dc at a speed, which is determined by multiplying the target relative speed VrGy_t determined by the equation (4) by a rate p determined by the following equation (7).

$$p = \frac{VrGy0 - VrGy\_offset}{VrGy0} \quad (7)$$

This corrected target relative speed determining equation corresponds to the following equation (9), which is transformed into the following equation (8) and then shifting the term of VrGy0 to the right side.

$$VrGy0 - VrGy\_t\_after = p \times (VrGy0 - VrGy\_t) = \quad (8)$$

$$\frac{VrGy0 - VrGy\_offset}{VrGy0} \times \left\{VrGy0 - \left(\begin{array}{c}-2.5 \times (D - Dc)^3 \times \\ 10^{\left(-1.303 \times \frac{(D-Dc)}{(D_0 - Dc)} + \frac{1}{10} \times KdB_0 - 6.697\right)}\end{array}\right)\right\}$$

$$VrGy\_t\_after = \qquad (9)$$

$$VrGy0 - \frac{VrGy0 - VrGy\_offset}{VrGy0} \times \left\{ VrGy0 - \left( \begin{array}{c} -2.5 \times (D - Dc)^3 \times \\ \left( -1.303 \times \frac{(D-Dc)}{(D_0 - Dc)} + \right) \\ 10^{\left( \frac{1}{10} \times KdB_0 - 6.697 \right)} \end{array} \right) \right\}$$

Figure 4A:
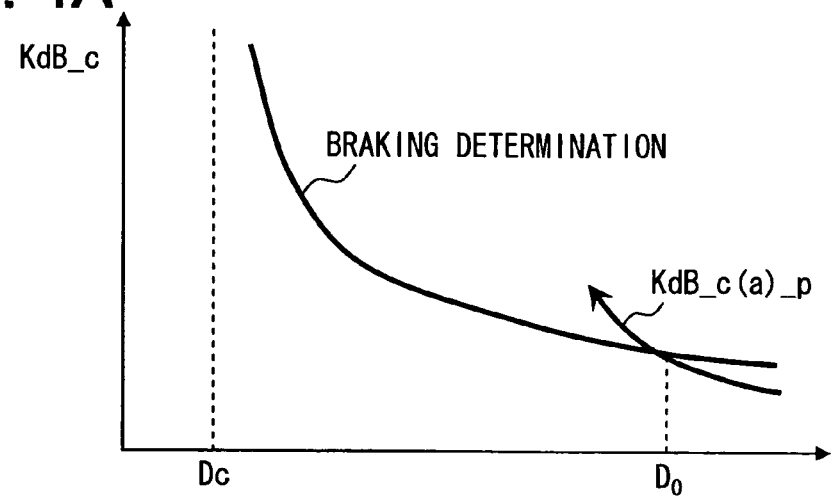
FIG. 4A is a graph showing a time point to start deceleration control.
Figure 4B:
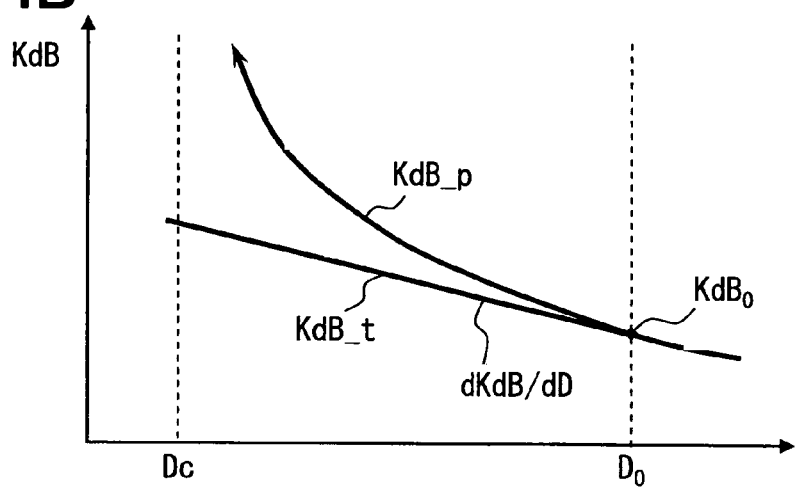
FIG. 4B is a graph showing a relation between a present evaluation index of an approach/separation condition and a target evaluation index indicating an approach/separation condition.
Figure 4C:
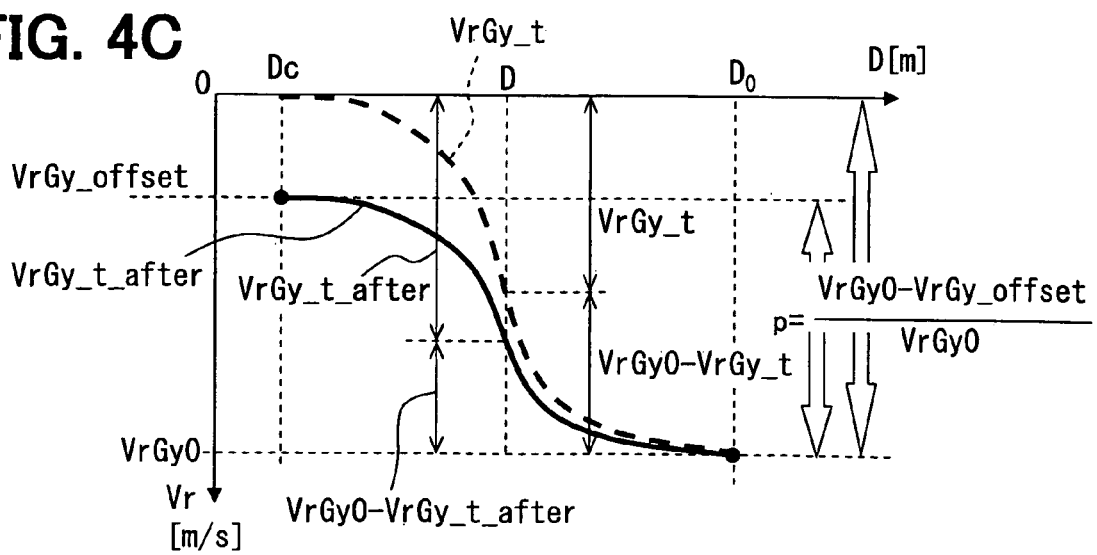
FIG. 4C is a graph showing a corrected target relative travel speed by which deceleration control is performed.

The target relative speed VrGy_t determined by the equation (4) and the corrected target relative speed VrGy_t_after determined by the equation (9) change as shown in FIG. 4C. As understood from the change characteristics shown in this graph, the corrected target relative speed VrGy_t_after attains the curve-time target speed VrGy_offset at the distance Dc, that is at the entrance of the curving road. As described above, since the relative speed is defined in relation to the entrance point of the curving road, this relative speed is opposite to the speed Vs0 of the subject vehicle in the polarity but equal to the speed Vs0 of the subject vehicle in the absolute value.

Figure 3:
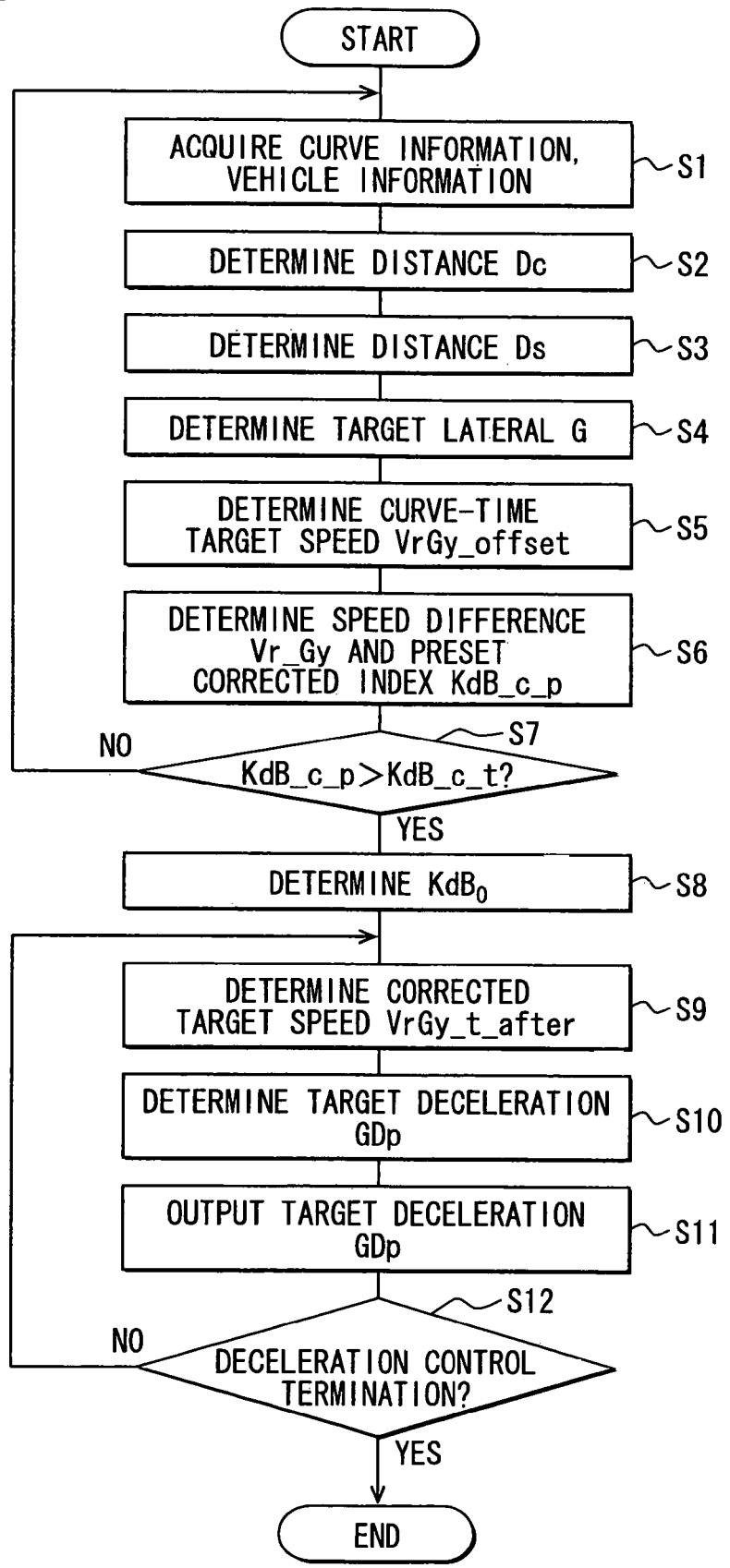
FIG. 3 is a flowchart showing deceleration control processing executed in the embodiment.

The vehicle control ECU 100 is configured to perform the deceleration control processing as shown in FIG. 3. It is assumed here that the subject vehicle is moving into the curving road of the radius of curvature R. This deceleration control processing is performed automatically in the case that the road ahead of the subject vehicle is curving. This information about the curving road is supplied through the road-vehicle communications device 60.

At S1, the ECU 100 acquires various information about the curving road. The information include the radius of curvature R, the road surface friction coefficient μ, the coordinates (latitude and longitude) of the entrance and the exit, the width, the number of lanes and the width of each lane, which are all about the curving road. The ECU 100 also acquires the various vehicle information, which includes the speed Vs0 of the subject vehicle and the present position of the subject vehicle defined by the coordinate (latitude and longitude).

At S2, the ECU 100 determines, by the equation (10), the distance Dc, which is from the entrance point of the curving road ahead the subject vehicle (end point of the straight part) to the outer road boundary of the curving road or the road fixture provided near such an outer boundary as shown in FIG. 2. L indicates the lateral position of the subject vehicle relative to the traffic lane mark. This lateral position of the subject vehicle is determined based on the width, the number of traffic lanes and the present travel lane of the subject vehicle, if these information are available in the navigation device 90. The lateral position of the subject vehicle is alternatively determined based on the lateral position of the preceding vehicle and the lateral displacement from the preceding vehicle by determining the lateral position of the preceding vehicle by the radar device 70, if it is possible to determine the displacement of the subject vehicle in the lateral direction from the preceding vehicle by the radar device 70.

$$Dc = [R^2 - (R - L)^2]^{\frac{1}{2}} \qquad (10)$$

At S3, the ECU 100 determines the total distance D between the subject vehicle and the outer road boundary of the curving road or the road fixture near the outer road boundary. The ECU 100 further determines by the following equation (11) the distance Ds between the subject vehicle and the entrance point of the curving road by subtracting the distance Dc determined at S2 from the total distance D.

$$Ds = D - Dc \qquad (11)$$

At S4, with reference to the curve road information acquired at S1, the ECU 100 determines a target lateral acceleration G (Gy_t) based on the road surface friction coefficient μ of the curving road. This target lateral G is for ensuring lateral force of tires when a steering wheel is operated by a driver at traveling the curving road, and determined based on Coulomb's law of friction.

At S5, the ECU 100 determines a speed of the subject vehicle allowed to turn the curving road with the target lateral G (Gy_t) determined at S4 by the following equation (12) as the curve-time target speed VrGy_offset.

$$VrGY\_offset = -\sqrt{R \times Gy\_t} \qquad (12)$$

At S6, the ECU 100 determines a speed difference VrGy between the curve-time target speed VrGy_offset determined at S5 and the present speed Vs0. The ECU 100 further determines the present value KdB_c(a)_p of the corrected evaluation index KdB_c(a) of the approach/separation condition by substituting the speed difference VrGy, the curve-time target speed VrGy_offset determined at S5 and the curve entrance arrival distance Ds determined at S3. The constant a in the equation (3) may be predetermined to 0.3, for example, based on experiment results.

At S7, the ECU 100 checks whether it is time to start the deceleration control in the subject vehicle, that is, whether the condition shown in FIG. 4A is satisfied. Specifically, it is checked whether the present value KdB_c(a)_p of the corrected evaluation index determined at S6 is greater than a threshold value KdB_c_t, which is determined by the braking determining equation calculated by the following equation (13) and the curve entrance arrival distance Ds determined at S3. If the check result at S7 is YES and NO, S8 is performed and S1 to S7 is repeated, respectively.

$$KdB\_c\_t = -23.76 \times \log_{10} Ds + 76.96 \qquad (13)$$

This braking determining equation is determined by correcting the following approximation equation (14) defining a relation between the corrected evaluation index calculated by the equation (2) and the distance between the subject vehicle and a preceding vehicle ahead the subject vehicle at the time of starting the braking operation. The corrected evaluation index KdB_c(a) is determined based on a result of experiment, in which a test driver starts to brake a vehicle at the latest possible time point to avoid collision with the preceding vehicle under a condition that the subject vehicle is approaching the preceding vehicle. That is, the braking determining equation (13) is derived by substituting D in the equation (14) with Ds.

$$KdB\_c\_t = -23.76 \times \log_{10} D + 76.96 \qquad (14)$$

This equation (14) indicates the starting point of the deceleration operation by the driver under the condition that the subject vehicle approaches the preceding vehicle. Therefore, the equation (13) indicates the starting point of the deceleration operation by the driver in the interval (D−Dc), that is, in the course of approaching the entrance of the curving road.

At S8, the ECU 100 determines an initial value kdB0 of the evaluation index by substituting into the following equation (15) the relative speed VrGy0 (=−Vs0) at the time of YES determination at S7 and the curve entrance arrival distance Ds (=D−Dc) determined at S3. This equation (15) is derived by transforming the equation (5).

$$K dB = 10 \times \log\left(\left|-2 \times \frac{VrGY0}{(D-Dc)^3} \times \frac{1}{5 \times 10^{-8}}\right|\right). \quad (15)$$

At S9, the ECU 100 determines the corrected target relative speed VrGy_t_after by using the equation (9). Specifically, in the similar manner as at S3, the curve entrance arrival distance Ds (=D−Dc) at present time is determined. The corrected target relative speed VrGy_t_after is determined by substituting into the equation (9) the present curve entrance arrival distance Ds, the initial value KdB0 of the evaluation index determined at S8, the curve entrance arrival distance (D0−Dc) used in determining its initial value KdB0 and the relative speed VrGy0 at the time of YES determination at S7.

As described above, the equation (9) is derived by correcting the equation (4). The equation (4) is determined from the equations (5) and (6). The equation (6) is a linear line having an inclination (rate of change: dKdB/dD) of the evaluation index at the time of determination of starting the deceleration as shown in FIG. 4B. Therefore, the corrected target relative speed VrGy_t_after determined at S9 changes in accordance with the change rate (inclination) dKdB/dD at the time of the time point of starting the deceleration. The equation (9) is a three-dimensional function of the curve entrance arrival distance Ds (=D−Dc). The corrected target relative speed VrGy_t_after changes as shown by the solid line in FIG. 4C.

At S10, the ECU 100 acquires the present speed Vs0 of the subject vehicle and determines the present relative speed VrGy_p from the present speed Vs0. The ECU 100 further determines the target relative deceleration GDp to be generated in the subject vehicle by substituting into the following equation (16) the present relative speed VrGy_p and the corrected target relative speed VrGy_t determined at S9. In the equation (16), T is a divisor for converting a difference between the present relative speed VrGy_p and the target relative speed VrGy_t into the target relative deceleration GDp. T may be set to an arbitrary value.

$$G_{Dp} = (VrGy\_p - VrGy\_t)/T \quad (16)$$

At S11, the ECU 100 outputs the target relative deceleration GDp determined at S10 to the VSC ECU 10. The VSC ECU 10 performs the automatic deceleration control by driving a brake actuator (not shown) so that the subject vehicle is decelerated at the target relative deceleration GDp inputted from the ECU 100.

At S12, the ECU 100 checks whether it is time to terminate the deceleration control, that is, whether a predetermined deceleration control termination condition is satisfied. The deceleration control termination condition may include, for example, that the subject vehicle stops, the present value KdB_c_p of the corrected evaluation index falls below the threshold value KdB_c_t determined by the braking determining equation, or the speed Vs0 of the subject vehicle falls below the curve-time target speed VrGy_offset. If the check result at S12 is NO, S9 to S12 are repeated until the deceleration control condition is satisfied.

In the above-described embodiment, the time point of starting the deceleration control before the curving road is determined based on the present value KdB_c(a)_p of the corrected evaluation index of approach/separation condition, which takes in the curve-time target speed VrGy_offset. Specifically, the deceleration control is started at the time point when the present value KdB_c(a)_p exceeds the threshold value KdB_c_t determined by the braking determining equation (13). Therefore, the deceleration control can be started automatically at the time point, which matches the driver's sense in driving the subject vehicle to pass the curving road at the curve-time target speed VrGy_offset.

The deceleration control is performed based on the corrected target relative speed VrGy_t_after determined by using the corrected target speed determining equation (9). The corrected target relative speed VrGy_t_after determined by the equation (9) changes smoothly as shown in FIG. 4C. The equation (9) is based on the evaluation index KdB, and this evaluation index KdB is well accepted as appropriately representing the actual driver's sense of danger among academic societies. Therefore, by performing the deceleration control based on the corrected target speed VrGy_t_after determined by the equation (9), the subject vehicle can be decelerated smoothly as if the driver actually decelerates to avoid danger.

As shown in FIG. 4C, the vehicle speed at the entrance of the curving road, that is, at the distance Dc from the outer boundary of the curving road, becomes the curve-time target speed VrGy_offset. Therefore, there arises no speed change (no point of inflexion between two speed lines before and after the entrance) in entering the curving road from the straight road. As a result, smooth travel is ensured.

The present invention is not limited to the disclosed embodiment, but may be modified or altered in many ways.

What is claimed is:

1. A vehicle speed control system comprising:
   a distance acquisition section for successively acquiring a curve entrance arrival distance, which is a distance from a subject vehicle to an entrance of a curving road existing ahead of the subject vehicle;
   a speed acquiring section for acquiring an actual speed of the subject vehicle;
   a curvature radius acquisition section for acquiring a radius of curvature of the curving road;
   a target speed setting section for setting a curve-time target speed, to which the subject vehicle is controlled in traveling the curving road, based on the radius of curvature of the curving road and a target lateral acceleration, which is a target for the subject vehicle to travel the curving road;
   a speed difference calculation section for calculating a difference between the curve-time target speed and the actual speed;
   an evaluation index calculation section for successively calculating a corrected approach/separation condition evaluation index, as an index indicating an approach/separation condition of the subject vehicle relative to the entrance of the curving road in correspondence to the curve-time target speed, based on a rate of time change of a seeming area of a forward object projected on a retina of a driver, the corrected evaluation index increasing as the speed difference increases and increasing at a greater rate as the curve entrance arrival distance decreases with respect to a same speed difference;
   a threshold checking section for checking whether the corrected approach/separation condition evaluation index calculated by the evaluation index calculation section exceeds a threshold value determined by a threshold calculation equation of the corrected approach/separation condition evaluation index;
   a memory section for storing a corrected target relative speed calculation equation, which corrects a target relative speed calculation equation so that a target relative speed at the entrance of the curving road becomes the curve-time target speed and a corrected target relative speed is calculated by multiplying a target relative speed calculated by the target relative speed calculation equation and a ratio of a difference between the speed of the subject vehicle at a time of starting control and the curve-time target speed relative to the speed of the subject vehicle at the time of starting control, the corrected target relative speed calculation equation being set by an approach/separation condition evaluation index relational equation, which defines a relation among the approach/separation condition evaluation index indicating the approach/separation condition of the subject vehicle relative to the entrance of the curving road ahead of the subject vehicle, the curve entrance arrival distance and the relative speed of the subject vehicle to the entrance of the curving road, the approach/separation condition evaluation index increasing as the relative speed increases and increasing at a greater rate as the curve entrance arrival distance decreases with respect to a same relative speed of the subject vehicle relative to the entrance of the curving road, a tangential line equation, which indicates a tangential line of a curve represented by the approach/separation condition evaluation index relational equation, is determined by differentiating the approach/separation condition evaluation index relational equation by the curve entrance arrival distance, and indicates a relation between the approach/separation condition evaluation index and the curve entrance arrival distance, and a target relative speed calculation equation, which is determined based on the approach/separation evaluation index relational equation and the tangential line equation thereby to determine the target relative speed based on the curve entrance arrival distance;

a target relative speed calculation section for calculating a corrected target relative speed based on the corrected target relative speed calculation equation stored in the memory section and the curve-entrance arrival distance actually acquired by the distance acquisition section, when the threshold check section determines that the corrected approach/separation condition evaluation index is determined to exceed the threshold value;

a target deceleration calculation section for calculating a target deceleration based on a corrected target deceleration calculated by the target relative speed calculation section and the actual speed of the subject vehicle based on the speed acquisition section; and a control section for controlling the subject vehicle to attain the target deceleration.

2. The vehicle speed control system according to claim 1, wherein:

the evaluation index calculation section calculates the corrected approach/separation condition evaluation index $KdB\_c(a)$ by a following equation (1)

$$KdB\_c(a) = 10 \times \log_{10}\left(\left|-2 \times \frac{VrGy - a \times VrGy\_offset}{Ds^3} \times \frac{1}{5 \times 10^{-8}}\right|\right)$$

wherein $VrGy$ is the speed difference calculated by the speed difference calculation section, $a$ is a constant, $VrGy\_offset$ is the curve-time target speed set by the target speed setting section, and $Ds$ is the curve entrance arrival distance acquired by the distance acquisition section.

* * * * *